(No Model.)

T. W. GRIERSON.
TAPE MEASURE.

No. 421,133. Patented Feb. 11, 1890.

WITNESSES:

INVENTOR:
T. W. Grierson
BY Munn & Co.
ATTORNEYS.

UNITED STATES PATENT OFFICE.

THOMAS W. GRIERSON, OF ST. PAUL, MINNESOTA.

TAPE-MEASURE.

SPECIFICATION forming part of Letters Patent No. 421,133, dated February 11, 1890.

Application filed April 9, 1889. Serial No. 306,502. (No model.)

*To all whom it may concern:*

Be it known that I, THOMAS W. GRIERSON, of St. Paul, in the county of Ramsey and State of Minnesota, have invented a new and useful Improvement in Tape-Measures, of which the following is a full, clear, and exact description.

My invention consists in the combination, with a common tape-measure, of an indicator constructed to slide upon the measure and to retain itself at any point thereon by frictional contact produced by a spring-actuated plate pivoted in the main body or frame of the indicator.

Reference is to be had to the accompanying drawings, forming a part of this specification, in which similar letters of reference indicate corresponding parts in all the figures.

Figure 1:
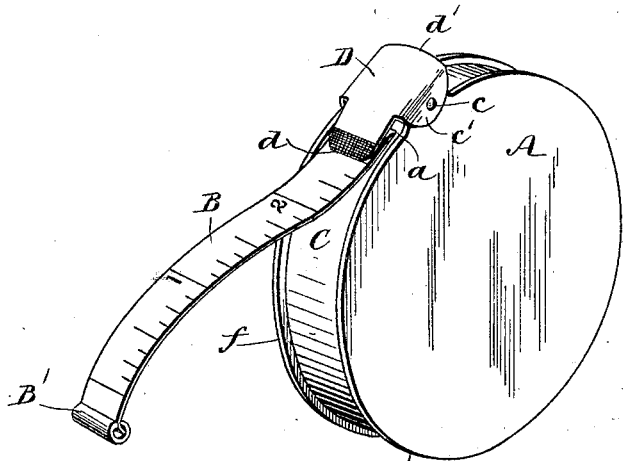
Figure 2:
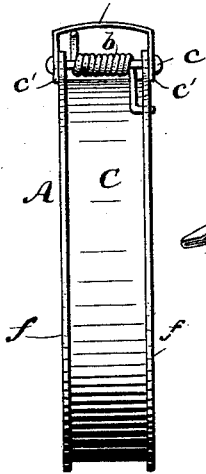
Figure 3:
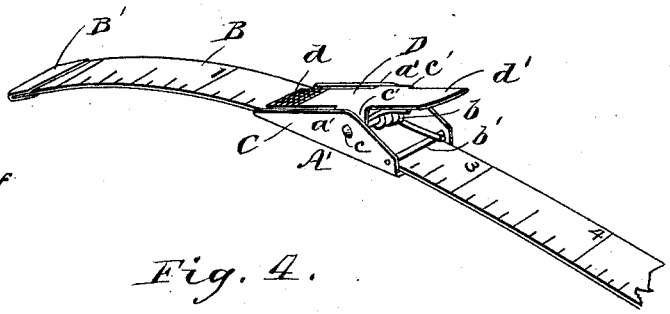
Figure 4:
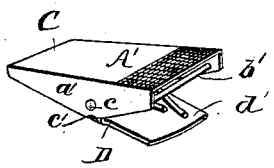

Figure 1 is a perspective view of a tape-measure and box having my invention applied thereto. Fig. 2 is an edge view of the same. Fig. 3 is a perspective view showing my invention applied directly to the tape, and Fig. 4 is a perspective view of the indicator detached and in inverted position.

A represents an ordinary tape-measure box containing a spring-actuated measuring-tape B. Near the opening $a$ in the outer wall C of the box, through which the tape issues, is pivoted the indicator D, the indicator point or edge $d$ of which is normally pressed into contact with the tape B by a small spring $b$, placed on the pivot $c$ of the indicator. The said pivot $c$ passes through the edge flanges $f f$ of the box A, as shown, and through small cheek-pieces $c'$ of the indicator. The indicating-point $d$ is of less width than the main body of the indicator and of less width than the space between the flanges $f f$, so that it normally presses down upon the tape B, holding it quite firmly down upon the outer wall, and thus acts to hold the tape at any point to which it may be drawn out, and at the same time indicates the graduation-mark.

In measuring, the tape will be applied from the end B' to the indicator, so that no attention need be paid to the graduation-mark—that is, it need not be remembered, as with common measures—but full reliance may be placed upon the indicator, which will securely hold the tape and show the proper graduation-mark. To permit the tape after use to be drawn back into the box, it is only necessary to press down upon the end $d'$ of the indicator-plate, and thus lift the pointer $d$ out of contact with the tape.

In applying my invention directly to the tape, as shown in Fig. 3, the indicator proper D, having the pointer $d$, will be pivoted in a supporting-frame C on a rod $c$, passing through the cheek-pieces $a' a'$ of the said frame and the cheek-pieces $c'$ of the indicator. On the rod $c$ is placed the small spring $b$, one end of which rests on a second rod $b'$, held in the cheek-pieces $a' a'$, while the opposite end acts upon the indicator D and normally holds its point $d$ pressed down upon the tape, nipping it between itself and the bottom A' of the frame C. The tape is passed under the rod $b'$, and thence out between the point of the frame C and the point $d$ of the indicator. The tension of the spring $b$ is sufficient to retain the indicator at any point at which it may be placed on the tape, so that in measuring it is to be slid upon the tape to the point desired, at which point it will stay, and thus indicate the proper graduation-mark.

Having thus described my invention, I claim as new and desire to secure by Letters Patent—

1. The combination, with a tape-measure-holding frame, of a pivoted and spring-pressed indicator carried by the said frame and engaging the tape-measure, substantially as herein shown and described.

2. The combination, with an ordinary tape-measure B, of a sliding indicator comprising a main body or frame, and a pivoted and spring-actuated plate D, arranged to grasp the tape and retain the indicator at any point along the tape by frictional contact, substantially as described.

3. The support C, having cheek-pieces $a' a'$ and rod $b'$, and the indicator D, pivoted to and between said cheek-pieces $a$ and formed with point $d$ and acted upon by a spring, in combination with the tape-measure B, held by the indicator D and rod $b'$, substantially as described.

THOMAS W. GRIERSON.

Witnesses:
 WARREN M. PERKINS,
 FRED S. BERRY.